United States Patent
Ohshima et al.

(10) Patent No.: US 9,641,713 B2
(45) Date of Patent: May 2, 2017

(54) APPARATUS AND METHOD FOR DEACTIVATING POWER-SAVING MODE, RELAY DEVICE, AND COMPUTER-READABLE STORAGE MEDIUM FOR COMPUTER PROGRAM

(75) Inventors: Atsushi Ohshima, Amagasaki (JP); Keisuke Teramoto, Itami (JP); Masami Yamada, Sennan-gun (JP); Yoshiaki Shibuta, Amagasaki (JP); Hiroaki Kubo, Muko (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 255 days.

(21) Appl. No.: 13/594,995

(22) Filed: Aug. 27, 2012

(65) Prior Publication Data

US 2013/0057883 A1   Mar. 7, 2013

(30) Foreign Application Priority Data

Sep. 2, 2011   (JP) ................................. 2011-191936

(51) Int. Cl.
G06F 15/00   (2006.01)
H04N 1/00   (2006.01)
(Continued)

(52) U.S. Cl.
CPC ......... *H04N 1/00891* (2013.01); *H04L 12/12* (2013.01); *H04N 1/00896* (2013.01);
(Continued)

(58) Field of Classification Search
CPC combination set(s) only.
See application file for complete search history.

(56) References Cited

U.S. PATENT DOCUMENTS

2005/0128515 A1*   6/2005   Ohno .......................... 358/1.15
2007/0234370 A1   10/2007   Nakagawa
(Continued)

FOREIGN PATENT DOCUMENTS

CN   102033595 A   4/2011
JP   2000-187579 A   7/2000
(Continued)

OTHER PUBLICATIONS

Japanese Office Action (Notification of Reasons for Refusal) dated Nov. 12, 2013, issued in corresponding Japanese Patent Application No. 2011-191936 and an English Translation thereof of the Japanese Office Action. (10pgs.).

(Continued)

*Primary Examiner* — Idowu O Osifade
(74) *Attorney, Agent, or Firm* — Buchanan Ingersoll & Rooney PC

(57) ABSTRACT

A power-saving mode deactivation apparatus for performing communication via a communication network with specific processing apparatuses for particular processing is provided. The power-saving mode deactivation apparatus includes a storage portion for storing therein a deactivation method for deactivating a power-saving mode of each of the specific processing apparatuses; a detection portion for detecting that particular processing data for the particular processing is not delivered to, among the specific processing apparatuses, a destination specific processing apparatus of the particular processing data, and a deactivation portion for performing, when the detection portion detects that the particular processing data is not delivered to the destination specific processing apparatus, deactivation processing for deactivating a power-saving mode of the destination specific processing apparatus based on the deactivation method, stored (Continued)

in the storage portion, for the destination specific processing apparatus.

19 Claims, 13 Drawing Sheets

(51) Int. Cl.
  *H04N 1/32* (2006.01)
  *H04L 12/12* (2006.01)
(52) U.S. Cl.
  CPC ..... *H04N 1/00907* (2013.01); *H04N 1/32502* (2013.01); *H04N 2201/0094* (2013.01); *Y02B 60/32* (2013.01); *Y02B 60/34* (2013.01)

(56) References Cited

U.S. PATENT DOCUMENTS

| | | | | |
|---|---|---|---|---|
| 2008/0186524 A1* | 8/2008 | Morimoto | ................. | 358/1.13 |
| 2009/0285221 A1* | 11/2009 | Ito | ................. | H04L 12/12 370/395.53 |
| 2010/0149581 A1* | 6/2010 | Shinto | ................. | G06K 15/02 358/1.14 |
| 2010/0161819 A1 | 6/2010 | Ohara | | |
| 2011/0078464 A1* | 3/2011 | Yokomizo | ................. | 713/300 |
| 2012/0057196 A1* | 3/2012 | Kamei | ................. | 358/1.15 |
| 2012/0224217 A1* | 9/2012 | Oba et al. | ................. | 358/1.15 |

FOREIGN PATENT DOCUMENTS

| | | |
|---|---|---|
| JP | 2000-235470 A | 8/2000 |
| JP | 2005-169623 A | 6/2005 |
| JP | 2005196741 A | 7/2005 |
| JP | 2006-18586 A | 1/2006 |
| JP | 2006-235941 A | 9/2006 |
| JP | 2007-249430 A | 9/2007 |
| JP | 200993432 A | 4/2009 |
| JP | 2010-141600 A | 6/2010 |
| JP | 2010-146340 A | 7/2010 |
| JP | 2010-225060 A | 10/2010 |
| JP | 2010-283734 A | 12/2010 |

OTHER PUBLICATIONS

Office Action (Decision of Rejection) issued on Sep. 7, 2015, by the Chinese Patent Office in corresponding Chinese Patent Application No. 201210320034.X, and an English Translation of the Office Action. (16 pages).

* cited by examiner

FIG. 5

|  | IMAGE FORMING APPARATUS 1A | IMAGE FORMING APPARATUS 1B | IMAGE FORMING APPARATUS 1C |
|---|---|---|---|
| SHORT-RANGE WIRELESS DEVICE (ZigBee) | YES | NO | NO |
| INTELLIGENT POWER STRIP | NOT CONNECTED | CONNECTED | NOT CONNECTED |
| WAKE ON LAN | NO | NO | YES |

POWER-SAVING MODE DEACTIVATED

| MAC ADDRESS | TCP/IP PORT NUMBER | DEACTIVATION METHOD | |
|---|---|---|---|
| XX:YY:ZZ :11:22:33 | 9100 or 515 | SEND WAKE-UP SIGNAL TO ADDRESS "001234" OVER ZigBee | ~6A (6) |
| XX:YY:ZZ :33:44:55 | 9000 or 515 | SEND WAKE-UP SIGNAL INDICATING ELECTRICAL OUTLET "01" TO ADDRESS "00EEFF" OVER ZigBee | ~6B (6) |
| XX:YY:ZZ :66:77:88 | 9100 or 515 | SEND MAGIC PACKETS OVER LAN | ~6C (6) |

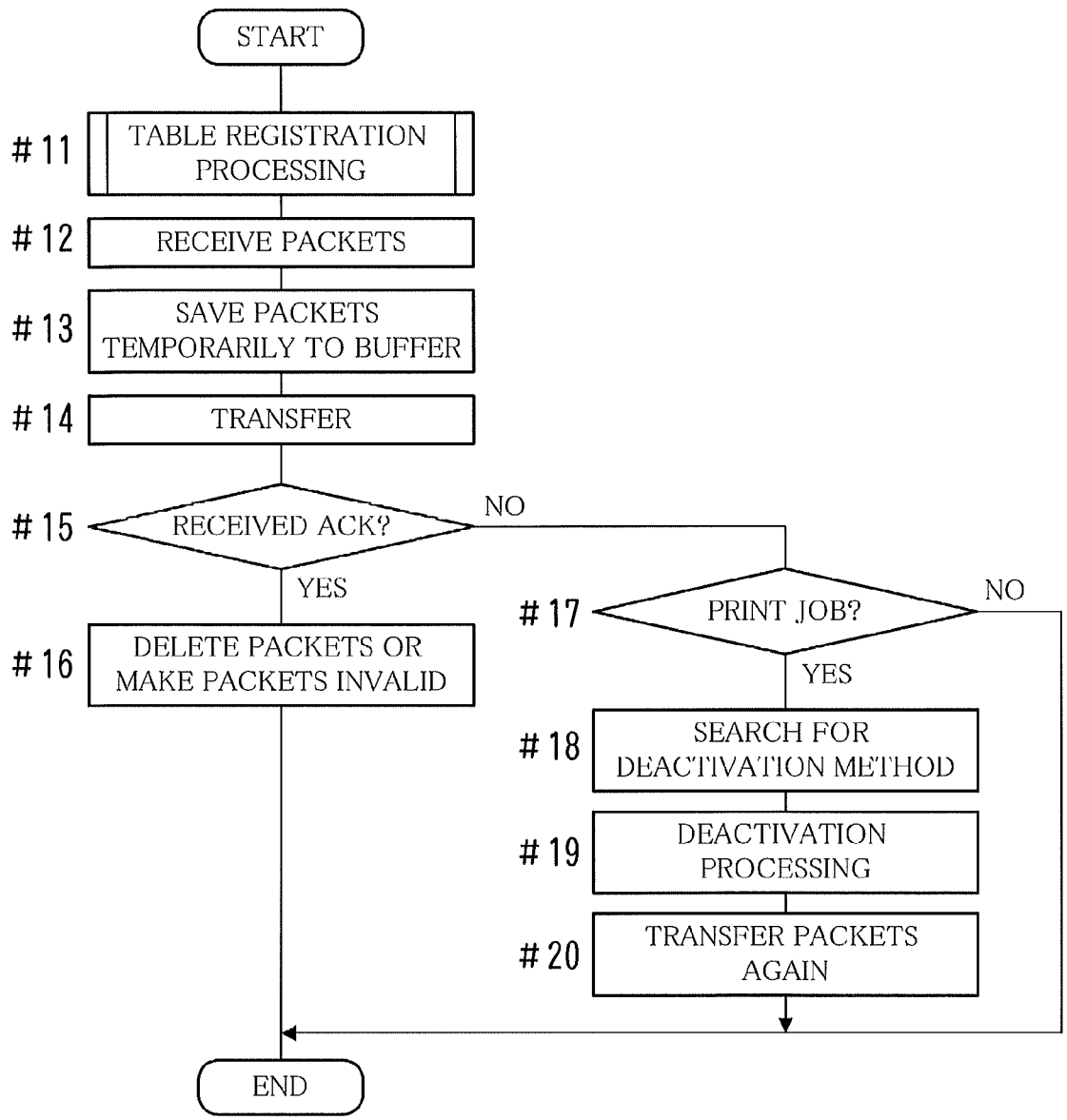

APPARATUS AND METHOD FOR DEACTIVATING POWER-SAVING MODE, RELAY DEVICE, AND COMPUTER-READABLE STORAGE MEDIUM FOR COMPUTER PROGRAM

This application is based on Japanese patent application No. 2011-191936 filed on Sep. 2, 2011, the contents of which are hereby incorporated by reference.

BACKGROUND OF THE INVENTION

1. Field of the Invention

The present invention relates to a technology for deactivating a power-saving mode of a specific processing apparatus performing particular processing, e.g., an image forming apparatus.

2. Description of the Related Art

In recent years, many different methods have been proposed for reducing power requirements of a variety of products. A method for reducing power requirements of an image forming apparatus is also proposed.

According to a conventional method, by shifting a power state in a printer that is supplied with power through a power control device from a normal power state to a power-saving state by connecting a power cord to an outlet of the power control device, the supply of the power from the outlet of the power control device to the printer is stopped. The power control device starts supplying power to the printer by receiving an image formation request or a warm-up request to the printer from an image formation requesting source, and restores the power state from the power-saving state to the normal power state (see the English abstract of Japanese Laid-open Patent Publication No. 2010-225060).

According to another conventional technology, an information processing system includes a first access means and a second access means which can communicate with a print device to be returned from a power saving state by access from an outside, and access the print device. The system also includes a request means which requests notification generated from the processing by the first access means; and a determining means which determines the presence or absence of notification of an event occurrence to the print device from the first access means. When the determining means determines that the notification of the event occurrence is present, the second access means accesses the print device (see the English abstract of Japanese Laid-open Patent Publication No. 2007-249430).

According to another conventional method, a request for the shift of an image formation apparatus which is not the request destination to a power-saving mode which is not a power-saving mode from which the image formation apparatus is restorable only by a predetermined start request is issued from a client device to the image formation apparatus (see the English abstract of Japanese Laid-open Patent Publication No. 2006-235941).

When an image forming apparatus is put in a power-saving mode, processing that can be executed thereby is sometimes restricted. To cope with this, the following conventional technologies are proposed.

According to one of the technologies, an image formation device has a control means to control the whole device; an information storage means to store information; and a communication means to transmit/receive information to/from a terminal connected thereto via a network. The communication means is equipped with a control means and a storage means operating independently of each other. In the normal operation mode, the control means responds to a request from the terminal. In the power saving mode, a control means provided in the communication means responds to the request from the terminal on behalf of the control means, based on the information received from the control means and stored in the storage means, and when a request associated with recovery of the normal operation mode is issued, information from the terminal is received and the information is stored in the information storage means until the device is restored to the normal operation mode (see the English abstract of Japanese Laid-open Patent Publication No. 2010-283734).

According to another one of the conventional technologies, a first MFP receives file information from a second MFP when the second MFP enters a power saving state. When receiving a file processing request packet for a file stored in the second MFP from another apparatus, the first MFP holds the processing request in a RAM. The first MFP sends the file processing request packet held in the RAM to the second MFP when the second MFP returns to a normal power state (see Japanese Laid-open Patent Publication No. 2010-146340).

According to another one of the conventional technologies, an information processor is capable of communicating with a print controller that restores the supply of power depending on the detection of a particular data pattern so that the information processor can respond to requests from external devices. The information processor includes a detection means for detecting the requirements for alternate printing; an issuing means for issuing data including the particular data pattern to the print controller; an acquisition means for acquiring the condition of a print controller which is a candidate for a proxy printer; a display control means for causing a display part to display the print controller that is the candidate for the proxy printer acquired by the acquisition means; and a job input means for inputting a proxy print job to the print controller selected in accordance with instructions from the candidate for the proxy printer displayed (see the English abstract of Japanese Laid-open Patent Publication No. 2006-018586).

According to another one of the conventional technologies, when printing devices are preset to a power saving mode, a radio starter monitors a printing request signal to be sent from host computers through a wire LAN, and sends a signal for prompting the resetting to a normal state, to a radio interface part of either of the printing devices supposed to print data, when a print request signal is sent. Since only a radio interface part is energized even in the printing devices preset to the power saving mode, the printing devices can be reset to the normal state (see the English abstract of Japanese Laid-open Patent Publication No. 2005-169623).

According to another one of the conventional technologies, printers connected with a network are recognized. When no printer in a normal mode is found, a printer which should be restored to the normal mode is selected from among the recognized printers. A control signal for restoring a printer from a power saving mode to the normal mode is transmitted to the selected printer, and the selected printer is restored from the power saving mode to the normal mode. After the lapse of a preset time, another printer is selected, and power management is operated so that printers can be alternately restored to the normal mode (see the English abstract of Japanese Laid-open Patent Publication No. 2000-235470).

Other than the conventional technologies discussed above, the following method is proposed as a method for preventing a file from being lost in a power-saving mode.

When a second MFP shifts to a power-saving state, a first MFP receives file information from the second MFP. The first MFP, upon receiving a file information acquisition request packet to the second MFP from another apparatus, transmits file information that has been received from the second MFP to the other apparatus. Furthermore, the first MFP acquires, as a proxy, a file to be stored in the second MFP and transmits the file acquired by proxy to the second MFP, when the second MFP returns to a normal power state (see Japanese Laid-open Patent Publication No. 2010-141600).

Further, the following method is proposed as a method for reducing a return time necessary for an apparatus to turn from a power-saving mode to a normal mode to carry out high-speed printing. Set information of a printer connected to a network through an IEEE1394 serial bus is recognized, and the existence/absence of a representing printer waiting in a normal mode is decided. When the representing printer is not set, a printer meeting prescribed selection reference is selected, and a continuous printing processable state is maintained (see the English abstract of Japanese Laid-open Patent Publication No. 2000-187579).

In the meantime, different types of image forming apparatuses have recently been provided in a network such as a Local Area Network (LAN). For example, some image forming apparatuses have a wireless communication function; others have no wireless communication function.

According to the conventional methods, in a network in which different types of image forming apparatuses are provided, power-saving modes of some of the image forming apparatuses cannot be deactivated appropriately.

SUMMARY

The present invention has been achieved in light of such an issue, and an object thereof is, in a network in which different types of image forming apparatuses for performing specific processing are provided, to deactivate a power-saving mode of an image forming apparatus more reliably than is conventionally possible.

In one aspect of the present invention, an apparatus for deactivating a power-saving mode of a plurality of specific processing apparatuses through communication via a communication network, the plurality of specific processing apparatuses configured to perform particular processing, the apparatus for deactivating a power-saving mode includes a storage portion configured to store therein a deactivation method for deactivating a power-saving mode of each of the plurality of specific processing apparatuses; a detection portion configured to detect that particular processing data for the particular processing is not delivered to one of the plurality of specific processing apparatuses, the one of the plurality of specific processing apparatuses being a destination specific processing apparatus of the particular processing data; and a deactivation portion configured to, when the detection portion detects that the particular processing data is not delivered to the destination specific processing apparatus, perform deactivation processing for deactivating a power-saving mode of the destination specific processing apparatus based on the deactivation method, stored in the storage portion, for the destination specific processing apparatus.

In another aspect of the present invention, a relay device for relaying, to a destination specific processing apparatus of a plurality of specific processing apparatuses configured to perform particular processing, particular processing data for the particular processing, the relay device includes a storage portion configured to store therein a deactivation method for deactivating a power-saving mode of each of the plurality of specific processing apparatuses; and a deactivation portion configured to, when the particular processing data cannot be relayed to the destination specific processing apparatus, perform deactivation processing for deactivating a power-saving mode of the destination specific processing apparatus based on the deactivation method, stored in the storage portion, for the destination specific processing apparatus.

Preferably, the relay device further includes an obtaining portion configured to obtain characteristic data indicating a characteristic of each of the plurality of specific processing apparatuses, and a determination portion configured to determine the deactivation method for each of the plurality of specific processing apparatuses based on the characteristic data. The storage portion stores thereinto the deactivation method determined by the determination portion.

Preferably, if the obtaining portion obtains, as the characteristic data of one of the plurality of specific processing apparatuses, data indicating that the one of the plurality of specific processing apparatuses is compatible with a Wake On LAN (WOL), then the determination portion determines that the deactivation method to be used for the one of the plurality of specific processing apparatuses is to send magic packets to the one of the plurality of specific processing apparatuses.

Preferably, if the obtaining portion obtains, as the characteristic data of one of the plurality of specific processing apparatuses, data indicating that a short-range wireless communication portion is provided which performs short-range wireless communication via a second communication network different from a communication network used for passing the particular processing data and operates even under a power-saving mode, then the determination portion determines that the deactivation method to be used for the one of the plurality of specific processing apparatuses is to send a signal for deactivating the power-saving mode to the one of the plurality of specific processing apparatuses via the second communication network.

Preferably, if the obtaining portion obtains, as the characteristic data of one of the plurality of specific processing apparatuses, data indicating that the one of the plurality of specific processing apparatuses is supplied with power via an intelligent power strip, then the determination portion determines that the deactivation method to be used for the one of the plurality of specific processing apparatuses is to instruct the intelligent power strip to start supplying power.

Preferably, the relay device further includes a transmission portion configured to, when the particular processing data cannot be relayed to the destination specific processing apparatus, send again the particular processing data to the destination specific processing apparatus after a preset time period has elapsed since the deactivation portion performed the deactivation processing.

These and other characteristics and objects of the present invention will become more apparent by the following descriptions of preferred embodiments with reference to drawings.

BRIEF DESCRIPTION OF THE DRAWINGS

FIG. 5 is a diagram showing an example of differences between image forming apparatuses in specifications.

FIG. 9 is a diagram showing an example of a power-saving mode deactivation table and deactivation method data.

FIG. 11 is a flowchart depicting an example of the flow of the entire processing performed by a switching hub.

DESCRIPTION OF THE PREFERRED EMBODIMENTS

Figure 1:
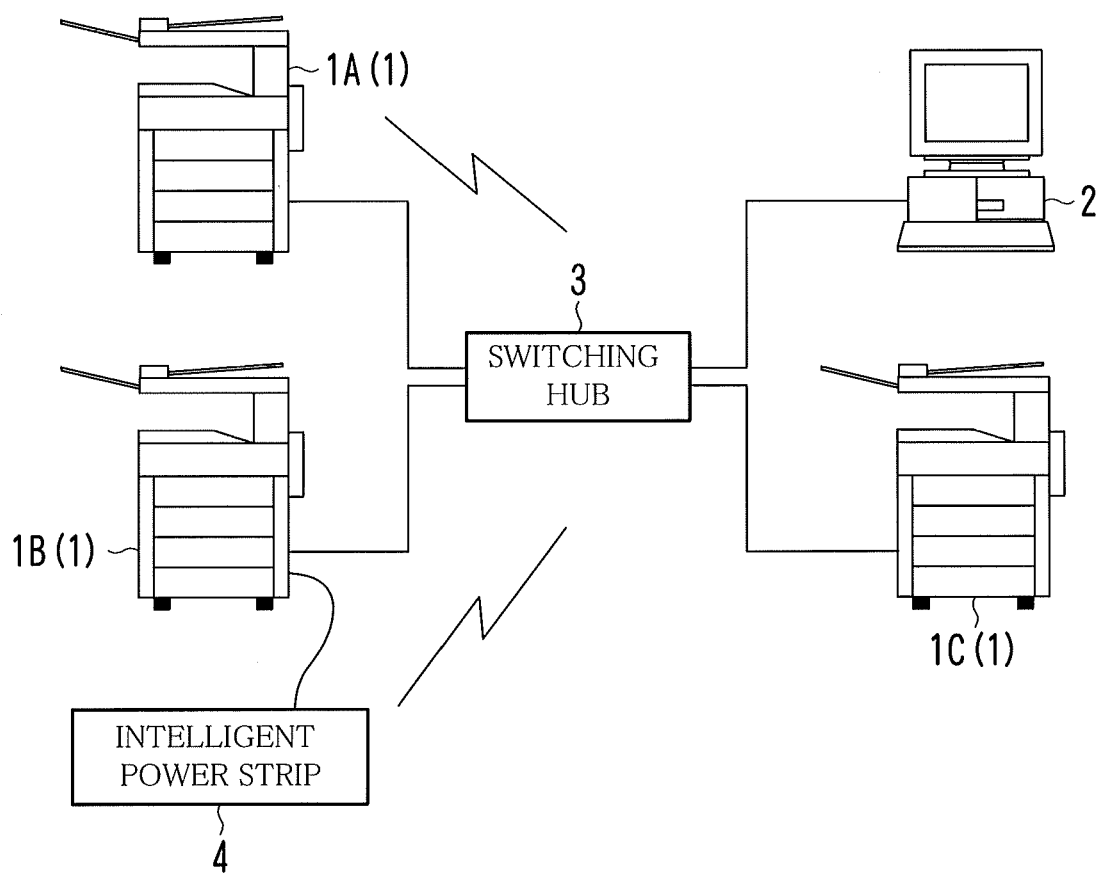
FIG. 1 is a diagram showing an example of the overall configuration of a printing system.
Figure 2:
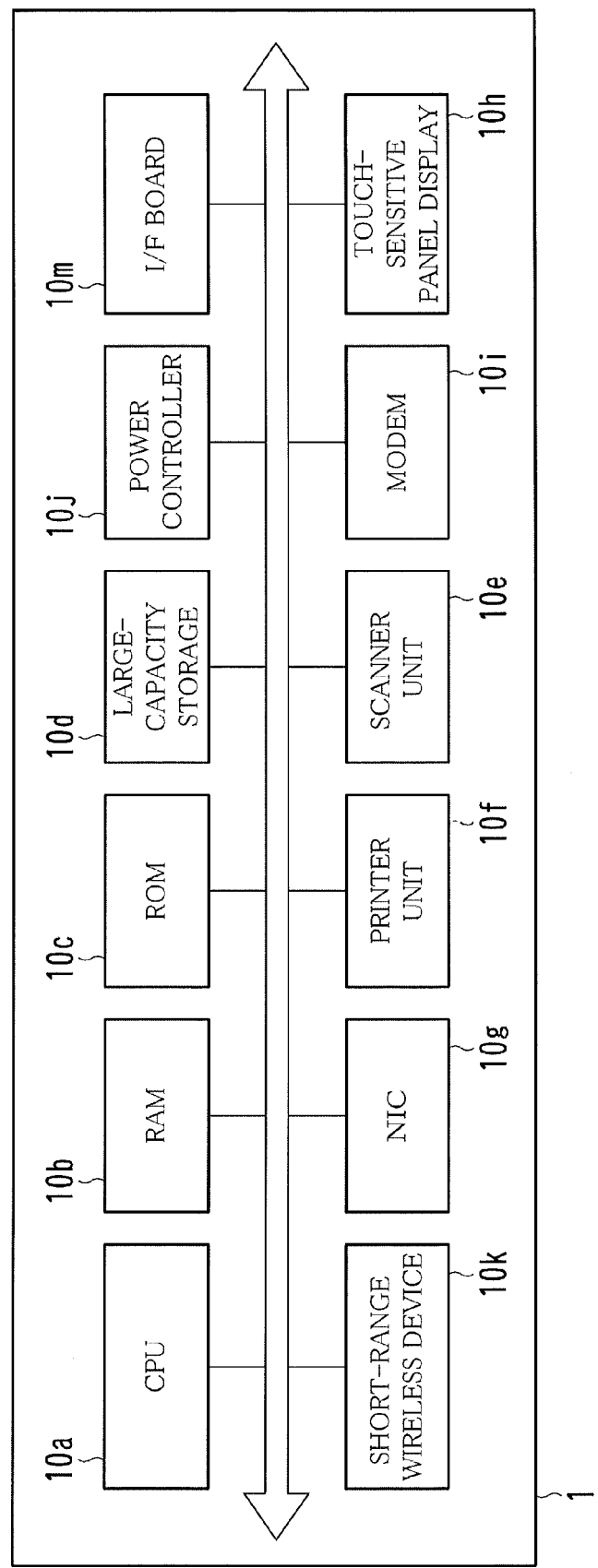
FIG. 2 is a diagram showing an example of the hardware configuration of an image forming apparatus.
Figure 3:
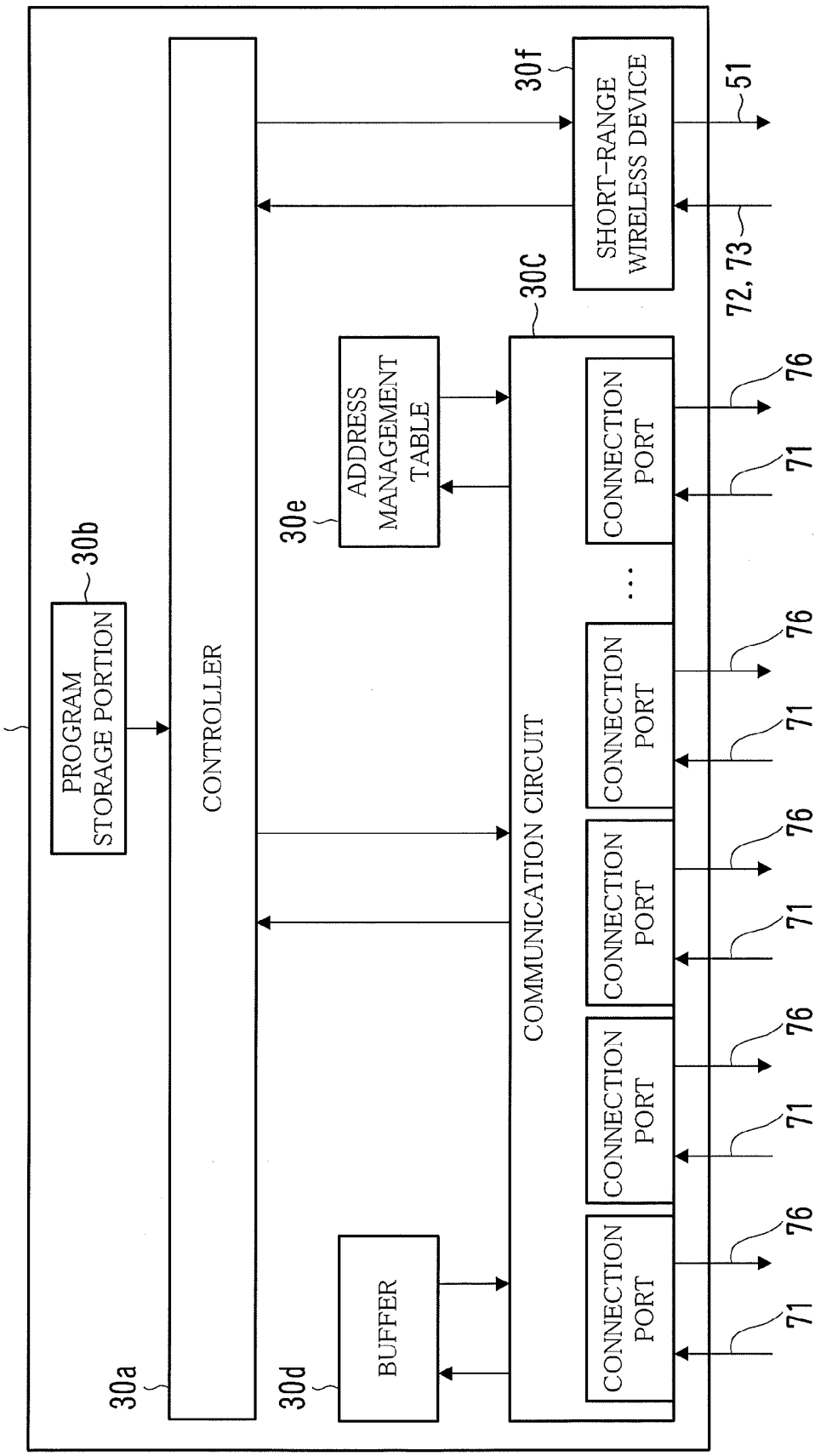
FIG. 3 is a diagram showing an example of the hardware configuration of a switching hub.
Figure 4:
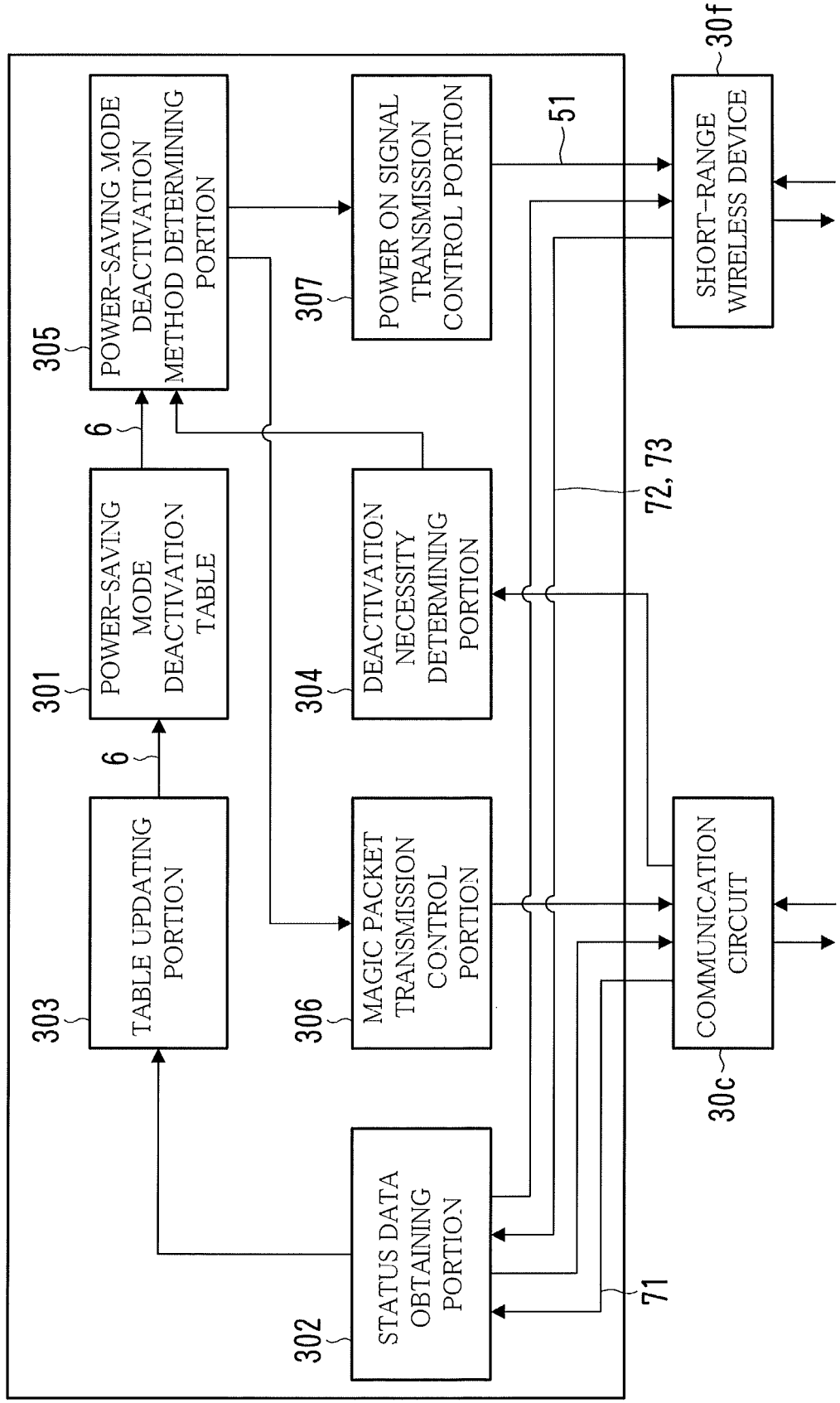
FIG. 4 is a diagram showing an example of the functional configuration of a switching hub.
Figure 6A:
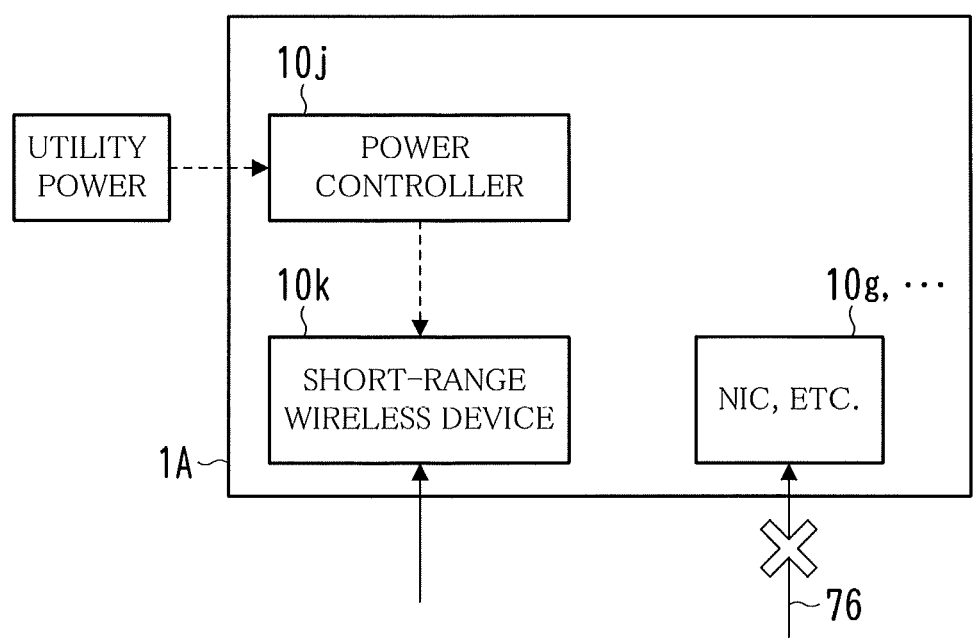
FIGS. 6A and 6B are diagrams showing an example as to how an image forming apparatus is supplied with power.
Figure 6B:
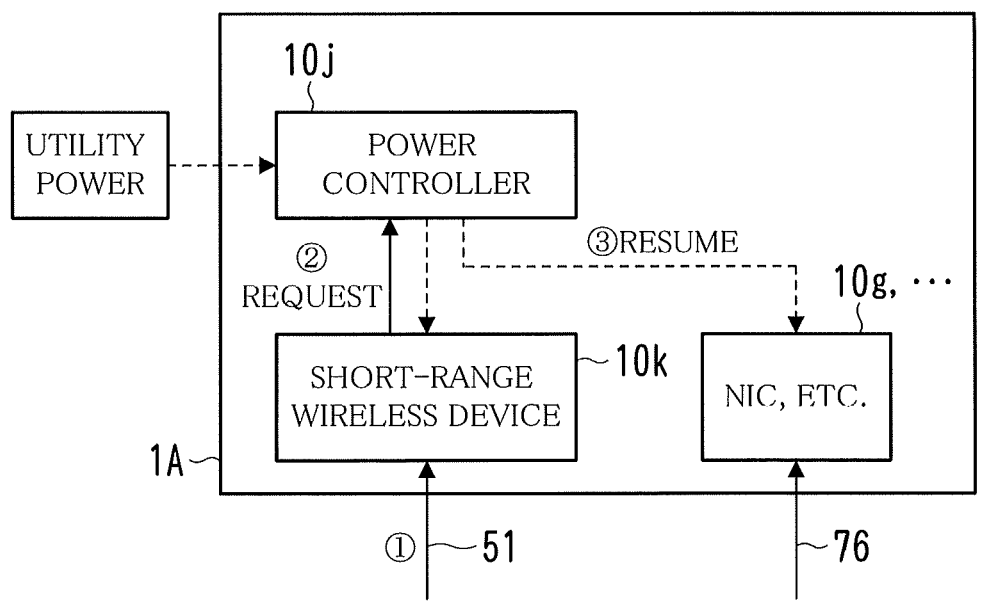
Figure 7:
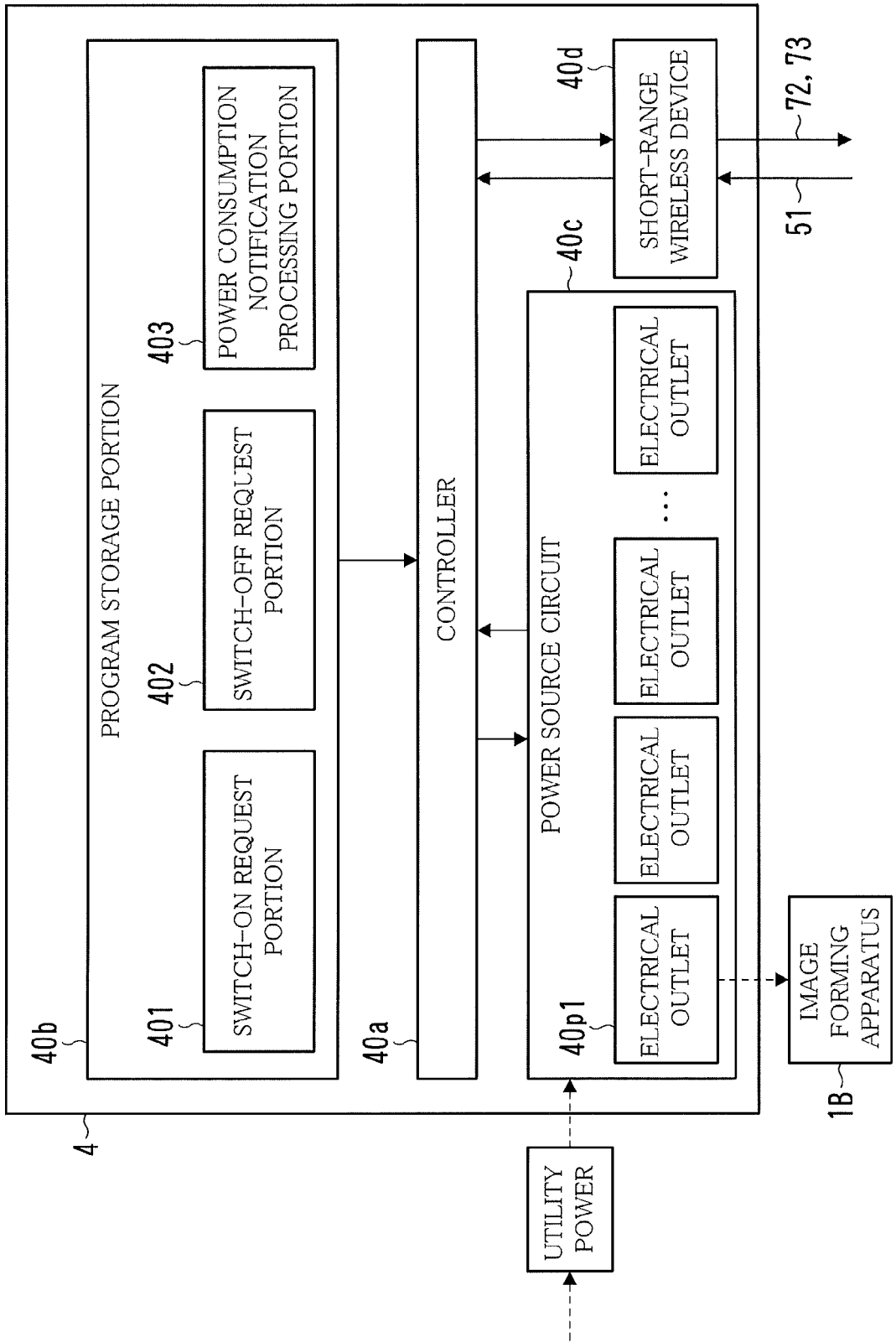
FIG. 7 is a diagram showing an example of a platform of an intelligent power strip.
Figure 8A:
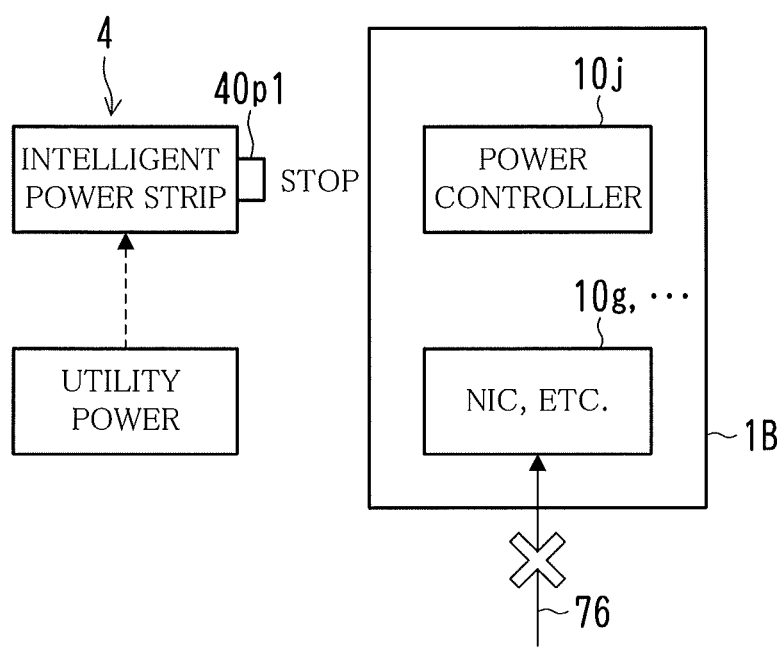
FIGS. 8A and 8B are diagrams showing an example as to how an image forming apparatus is supplied with power.
Figure 8B:
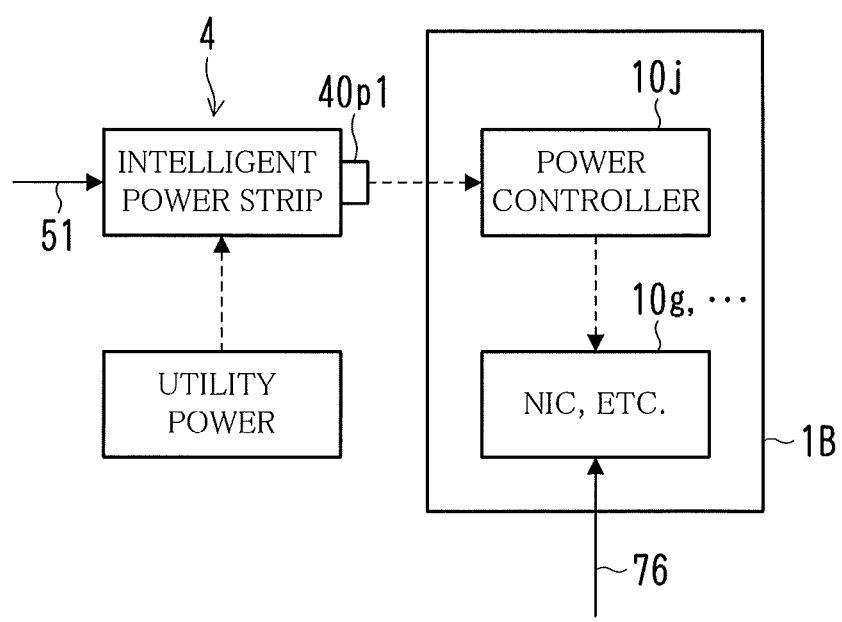

FIG. 1 is a diagram showing an example of the overall configuration of a printing system 100; FIG. 2 is a diagram showing an example of the hardware configuration of an image forming apparatus 1; FIG. 3 is a diagram showing an example of the hardware configuration of a switching hub 3; FIG. 4 is a diagram showing an example of the functional configuration of the switching hub 3; FIG. 5 is a diagram showing an example of differences between image forming apparatuses 1A-1C in specifications; FIGS. 6A and 6B are diagrams showing an example as to how the image forming apparatus 1A is supplied with power; FIG. 7 is a diagram showing an example of a platform of an intelligent power strip 4; and FIGS. 8A and 8B are diagrams showing an example as to how the image forming apparatus 1B is supplied with power.

Referring to FIG. 1, the printing system 100 is configured of a plurality of image forming apparatuses 1, at least one terminal 2, the switching hub 3, the intelligent power strip 4, and so on.

Each of the image forming apparatuses 1 and the terminal 2 has a Network Interface Card (NIC) which is connected to the switching hub 3 via a twisted-pair cable. Thereby, the image forming apparatuses 1 and the terminal 2 perform communication with one another via the switching hub 3.

The image forming apparatus 1 is an apparatus that is generally called a "multifunction device" or a "Multi-Functional Peripheral (MFP)". The image forming apparatus 1 is an apparatus in which various functions such as copying, faxing, scanning, network printing, and box function are consolidated. Hereinafter, three specific apparatuses of the image forming apparatuses 1 may be described separately as an "image forming apparatus 1A", an "image forming apparatus 1B", and an "image forming apparatus 1C".

The "network printing function" is a function to print an image onto paper based on image data received from a personal computer or the like. The network printing function is sometimes called a "PC printing function".

The "box function" is a function in which a storage area called a "personal box" or "box" and corresponding to a folder or directory in a personal computer is allocated to each user for management. The "box function" is sometimes called a "document server function". The "box function" enables a user to save image data and so on to his/her personal box on a file-by-file basis.

As shown in FIG. 2, the image forming apparatus 1 is configured of a Central Processing Unit (CPU) 10a, a Random Access Memory (RAM) 10b, a Read Only Memory (ROM) 10c, a large-capacity storage 10d, a scanner unit 10e, a printer unit 10f, an NIC 10g, a touch-sensitive panel display 10h, a modem 10i, a power controller 10j, an interface board 10m, and the like.

Some of the image forming apparatuses 1 are further provided with a short-range wireless device 10k. The short-range wireless device 10k may be built in the image forming apparatus 1 or may be provided externally through the interface board 10m. The interface board 10m may be a board compatible with a Universal Serial Bus (USB) or with Institute of Electrical and Electronics Engineers (IEEE) 1394.

As described above, the NIC 10g is connected to the switching hub 3 via the twisted-pair cable. The NIC 10g performs communication with the terminal 2 and another image forming apparatus 1 in accordance with a protocol such as Transmission Control Protocol/Internet Protocol (TCP/IP).

The NIC 10g also performs communication with the switching hub 3 in accordance with Simple Network Management Protocol (SNMP).

The touch-sensitive panel display 10h displays, for example, a screen for presenting messages or instructions to a user, a screen for allowing a user to input processing commands and conditions, and a screen showing the results of processing performed by the CPU 10a. The touch-sensitive panel display 10h also detects a position touched by user's finger, and transmits a signal indicating the detection result to the CPU 10a.

The scanner unit 10e serves to read out an image such as photographs, characters, pictures, charts, and the like that are recorded on a sheet of paper, and to generate image data thereof.

The modem 10i is a device to send and receive image data, based on a protocol such as G3, with fax terminals via a fixed telephone network.

The printer unit 10f prints an image read out by the scanner unit 10e and an image indicated in image data sent by the terminal 2 or a fax terminal. The printer unit 10f is provided with a fuser including a heating portion and a pressure portion. The printer unit 10f performs a printing process by causing the fuser to perform a heating/pressing process on a toner image formed on a sheet of paper.

The power controller 10j distributes power supplied from utility power to the individual pieces of hardware constituting the image forming apparatus 1.

The short-range wireless device 10k performs short-range wireless communication with another device at low power usage. As the short-range wireless device 10k, a device suitable for ZigBee standards is used.

The ROM 10c or the large-capacity storage 10d stores, therein, operating system, middleware, and application programs for implementing the functions discussed above. These programs are loaded into the RAM 10b as needed and executed by the CPU 10a. The large-capacity storage 10d can be a Hard Disk Drive (HDD), a Solid State Drive (SSD), or the like.

The terminal 2 is a client for a user to remotely use the foregoing functions provided in the image forming apparatus 1. The terminal 2 has installed therein various programs for controlling the image forming apparatus 1, e.g., a printer driver. The terminal 2 may be a personal computer, a Personal Digital Assistant (PDA), or a smartphone, for example.

Referring to FIG. 3, the switching hub 3 is configured of a controller 30a, a program storage portion 30b, a communication circuit 30c, a buffer 30d, an address management table 30e, a short-range wireless device 30f, and so on.

The communication circuit 30c serves to receive packets from a transmission source device and send the packets to a destination device. To be more specific, the communication circuit 30c has a plurality of ports (at least four ports in this embodiment). When receiving packets from the transmission source device, the communication circuit 30c sends out the packets only to a port connected to the destination device.

The buffer 30d temporarily stores therein the packets sent from the transmission source device until the packets are successfully transmitted to the destination device. Alternatively, the buffer 30d temporarily stores therein the same until a timeout occurs.

The address management table 30e contains, for each port of the communication circuit 30c, Media Access Control (MAC) addresses of devices connected to the corresponding port. The communication circuit 30c sends out the packets sent from the transmission source device to a particular port based on the address management table 30e.

In general, a "port" means a socket for connecting a device to another device, i.e., a physical interface, in some cases, and also means an application for data passing in accordance with the TCP/IP in other cases. Hereinafter, a port corresponding to the former is referred to as a "connection port" and a port corresponding to the latter is referred to as a "TCP/IP port", so that both the ports are distinguished from each other.

The foregoing packets relay processing is the same as the conventional packets relay processing. The switching hub 3 is also provided with a mechanism for processing packets to be transmitted to an image forming apparatus 1 put in a power-saving mode or in a power-off state. Note that the power-saving modes come in different kinds depending on how the individual pieces of hardware are supplied with power. In this embodiment, the power-saving mode is a mode in which at least the short-range wireless device 10k is supplied with power and at least the NIC 10g is not supplied with power. However, when an NIC compatible with a Wake-On-LAN (WOL) is used as the NIC 10g, power is supplied to, even in the power-saving mode, at least a circuit for deactivating the power-saving mode in response to the receipt of packets and returning to a normal mode among the devices constituting the NIC 10g.

In the case where the short-range wireless device 10k is provided externally through the interface board 10m, the interface board 10m is supplied with power even in the power-saving mode.

The program storage portion 30b stores, therein, programs for implementing the functions of a power-saving mode deactivation table 301, a status data obtaining portion 302, a table updating portion 303, a deactivation necessity determining portion 304, a power-saving mode deactivation method determining portion 305, a magic packet transmission control portion 306, a power ON signal transmission control portion 307, and so on all of which are shown in FIG. 4. The program storage portion 30b may be a ROM, a flash memory, and the like.

The controller 30a executes the programs stored in the program storage portion 30b, and thereby, controls the individual pieces of hardware of the switching hub 3.

The short-range wireless device 30f is manufactured under the same standard as that of the short-range wireless device 10k of the image forming apparatus 1. The short-range wireless device 30f performs wireless communication with other devices.

Meanwhile, as shown in FIG. 5, the image forming apparatuses 1A-1C have different features of the power source. The individual features are described below.

The image forming apparatus 1A is provided with the short-range wireless device 10k. If the image forming apparatus 1A has not performed any jobs, i.e., has been idle, for a preset time period, the image forming apparatus 1A is turned into the power-saving mode. The following is a description of the operation of the individual portions of the image forming apparatus 1A put in the power-saving mode (see FIGS. 6A and 6B).

When the image forming apparatus 1A is placed in the power-saving mode as shown in FIG. 6A, the power controller 10j supplies power to the short-range wireless device 10k and supplies no power to the NIC 10g. This enables the short-range wireless device 10k to receive data from other devices. The NIC 10g, however, is not capable of receiving data therefrom due to the power supply control by the power controller 10j.

As shown in FIG. 6B, when receiving (encircled number 1), from the switching hub 3, a signal (hereinafter referred to as a "wake-up signal 51") indicating a command to deactivate the power-saving mode, the short-range wireless device 10k requests (encircled number 2) the power controller 10j to deactivate the power-saving mode. In response to the request, the power controller 10j starts (encircled number 3) supplying power to all the pieces of the hardware including the NIC 10g. This enables the NIC 10g to receive data from other devices.

In contrast to this, the image forming apparatus 1B is not provided with the short-range wireless device 10k. The image forming apparatus 1B is not provided with a function for the power-saving mode either. The image forming apparatus 1B, however, is supplied with power from utility power through the intelligent power strip 4. The image forming apparatus 1B reduces power consumption thanks to the intelligent power strip 4.

Referring to FIG. 7, the intelligent power strip 4 is configured of a controller 40a, a program storage portion 40b, a power source circuit 40c, a short-range wireless device 40d, and so on. In general, the intelligent power strip 4 is sometimes called a "smart power strip".

The program storage portion 40b is configured of a switch-ON request portion 401, a switch-OFF request portion 402, a power consumption notification processing portion 403, and so on.

The controller 40a executes programs stored in the program storage portion 40b to control all the pieces of hardware of the intelligent power strip 4.

The short-range wireless device 40d is manufactured under the same standard as that of the short-range wireless device 30f of the switching hub 3. The short-range wireless device 40d performs wireless communication with other devices.

The power source circuit 40c is provided with a plurality of electrical outlets. In accordance with a command from the controller 40a, the power source circuit 40c starts or stops supplying power to other devices via the electrical outlets.

The power source circuit 40c also informs the controller 40a of transitions of power supplied to other devices via the individual electrical outlets.

Referring to FIGS. 8A and 8B, descriptions are given as to how power supply to the image forming apparatus 1B is switched via an electrical outlet to which the image forming apparatus 1B is connected. Hereinafter, the electrical outlet is referred to as an "electrical outlet 40p1".

In the meantime, while an image forming apparatus is idle, the power consumption thereof or a time-average value of the power consumption thereof is generally a constant value or less.

The switch-OFF request portion 402 determines whether or not the image forming apparatus 1B has been idle for a preset time period or longer based on the information, sent from the power source circuit 40c, on transitions of power supplied to the image forming apparatus 1B via the electrical outlet 40p1. If the determination is positive, then the switch-OFF request portion 402 requests the power source circuit 40c to stop outputting power to the electrical outlet 40p1. In response to the request, the power source circuit 40c stops supplying power to the electrical outlet 40p1. Thereby, no power is supplied to the image forming apparatus 1B as shown in FIG. 8A, so that the power source of the image forming apparatus 1B is turned into OFF.

Thereafter, when the short-range wireless device 40d receives a wake-up signal 51 indicating an identifier of the electrical outlet 40p1, the switch-ON request portion 401 makes a request to start supplying power from the electrical outlet 40p1. In response to the request, the power source circuit 40c starts supplying power to the electrical outlet 40p1. Thereby, power is supplied to the image forming apparatus 1B as shown in FIG. 8B, so that the image forming apparatus 1B starts up.

The image forming apparatus 1C is not provided with the short-range wireless device 10k. If the image forming apparatus 1C has been idle for a preset time period or longer, then the image forming apparatus 1C is turned into the power-saving mode.

The NIC 10g, Basic Input/Output System (BIOS), and the operating system of the image forming apparatus 1C are compatible with the WOL. Thus, the image forming apparatus 1C can be switched between ON and OFF in response to magic packets. On the other hand, the image forming apparatus 1A and the image forming apparatus 1B are not compatible with the WOL.

Descriptions are provided below of the functions implemented by the programs stored in the program storage portion 30b shown in FIG. 4, the content of the processing performed by the communication circuit 30c and the short-range wireless device 30f.

[Information Gathering for Deactivation of Power-Saving Mode, Etc.]

Figure 10:
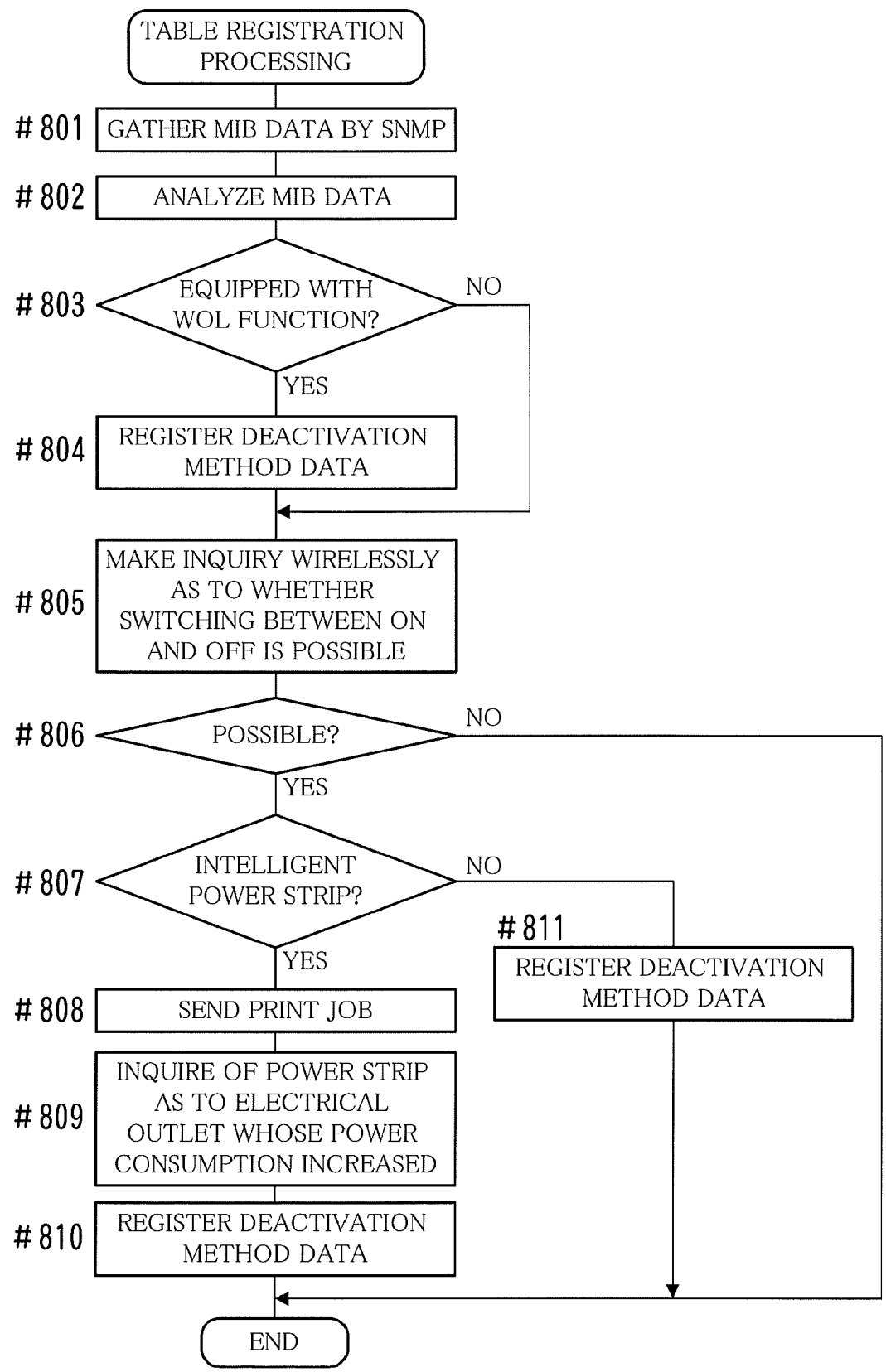
FIG. 10 is a flowchart depicting an example of the flow of table registration processing.

FIG. 9 is a diagram showing an example of the power-saving mode deactivation table 301 and deactivation method data 6. FIG. 10 is a flowchart depicting an example of the flow of table registration processing.

Referring to FIG. 9, the power-saving mode deactivation table 301 contains records of deactivation method data 6 in such a manner that one record corresponds to one of the image forming apparatuses 1. The deactivation method data 6 indicates how to deactivate a power-saving mode of the corresponding image forming apparatus 1 or how to turn on the corresponding image forming apparatus 1.

In the deactivation method data 6, "MAC address" indicates a MAC address of the corresponding image forming apparatus 1. Further, "TCP/IP port number" shows the number of a TCP/IP port (port number) used for the terminal 2 to give a job to the corresponding image forming apparatus 1. Further, "deactivation method" indicates a method for deactivating the power-saving mode of the corresponding image forming apparatus 1, or, alternatively, a method for turning ON the corresponding image forming apparatus 1. Hereinafter, for simplicity of explanation, an example is described in which the image forming apparatus 1 is given a network print job. The individual sets of deactivation method data 6 may be described separately as "deactivation method data 6A", "deactivation method data 6B", and so on.

Note that, in general, the number "515" is used as a port number for Line Printer daemon Protocol (LPR) printing. The number "9100" is used as a port number for RAW printing.

Instead of the foregoing, another arrangement is possible in which a user checks the specifications of all the image forming apparatuses 1 to enter records of deactivation method data 6 therefor to the switching hub 3. In such a case, the switching hub 3 may be equipped, in advance, with a web server function and a Common Gateway Interface (CGI) function. Then, a web page for data entry may be delivered to the terminal 2 or the like so that the user is prompted to input data to the web page. The details inputted by the user may be sent from the terminal 2.

In this embodiment, the switching hub 3 includes the status data obtaining portion 302 and the table updating portion 303 as functions for automatically obtaining these sets of deactivation method data 6. Descriptions are provided below, with reference to the flowchart of FIG. 10, of an example of the flow of processing for obtaining the deactivation method data 6.

Each of the image forming apparatuses 1 is preinstalled with an SNMP agent, while the switching hub 3 is preinstalled with an SNMP manager.

The status data obtaining portion 302 causes the SNMP manager to receive (Step #801), from the SNMP agents of the individual image forming apparatuses 1, data registered in Management Information Bases (MIBs) of the individual image forming apparatuses 1. Hereinafter, such data is referred to as "management data 71". At this time, the data are received through the individual connection ports of the communication circuit 30c.

The table updating portion 303 analyzes the individual sets of management data 71 to identify an image forming apparatus 1 equipped with the WOL function (Step #802). If such an image forming apparatus 1 is identified (Yes in Step #803), then deactivation method data 6 corresponding to the image forming apparatus 1 is created and registered in the power-saving mode deactivation table 301 (Step #804).

The created deactivation method data 6 has, in "MAC address", a MAC address of the identified image forming apparatus 1. The deactivation method data 6 shows, in "deactivation method", that magic packets are to be sent over a Local Area Network (LAN). In "TCP/IP port number" of the created deactivation method data 6, a port number of a port (TCP/IP port) used by the identified image forming apparatus 1 for network printing is indicated.

The port number may be determined based on the management data 71. In order to determine a commonly-used port number such as "515" of a well-known port, the port number may be determined based on network print job data, which is to be sent later from the terminal 2 to the image forming apparatus 1, and on the result of processing by the image forming apparatus 1 (job history information indicating that print processing was performed). The same is similarly applied to a method for identifying a port number discussed later. A port number is associated with specific processing for which deactivation of a power-saving mode is necessary, e.g., a network print job. This makes it possible to determine whether or not certain processing is specific processing based on the port number. Thereby, it is possible to determine whether or not a power-saving mode should be deactivated by using a method indicated in "deactivation method" of the deactivation method data 6.

When the processing of Steps #801-#804 is performed, deactivation method data 6C is stored in the switching hub 3 as deactivation method data 6 for the image forming apparatus 1C.

In parallel with the processing of Steps #801-#804 or before or after the same, the status data obtaining portion 302 inquires, over ZigBee, of the individual short-range wireless devices as to whether or not the devices can control switching between ON and OFF of the power source (Step #805).

In response to the inquiry, if the individual short-range wireless devices such as the short-range wireless device 10k and the short-range wireless device 40d can control such switching, then the individual short-range wireless devices send, over ZigBee, switchable reply data 72 indicating the fact. A short-range wireless device provided in an apparatus within the LAN, e.g., the image forming apparatus 1A, sends switchable reply data 72 which indicates the foregoing fact and also indicates a MAC address of the subject apparatus. In this way, the status data obtaining portion 302 obtains the switchable reply data 72. At this time, the data is sent and received via the short-range wireless device 30f.

When the switchable reply data 72 is obtained (Yes in Step #806), the table updating portion 303 creates deactivation method data 6 depending on the transmission source device of the switchable reply data 72 in the following manner.

If the intelligent power strip 4 is the transmission source device of the switchable reply data 72 (Yes in Step #807), then the table updating portion 303 transmits network print job data via the communication circuit 30c to the image forming apparatus 1 (Step #808). Immediately after the transmission, the table updating portion 303 makes an inquiry, via the short-range wireless device 30f, to the intelligent power strip 4 about an electrical outlet whose power consumption has increased by a constant value or greater (Step #809).

Data for printing a so-called test page may be sent, as the job data, to the image forming apparatus 1. In such a case, the job data is sent to one of the image forming apparatuses 1, and the intelligent power strip 4 is requested to reply to the inquiry. Then, after a time required for printing, e.g., 2 minutes, has elapsed, the job data is sent to another image forming apparatus 1 and the intelligent power strip 4 is requested to reply to the inquiry.

Alternatively, the following arrangement is also possible: The switching hub 3 waits for network print job data sent by the terminal 2. When receiving the network print job data, the switching hub 3 transmits the same only to an image forming apparatus 1 that is the transmission destination device as usual. Immediately after the transmission, the switching hub 3 requests a reply to the inquiry from the intelligent power strip 4.

When receiving the network print job data, the image forming apparatus 1 performs print processing. At this time, power consumption of the image forming apparatus 1 increases up to the constant value or greater.

With the intelligent power strip 4, upon the receipt of the request from the switching hub 3, the power consumption notification processing portion 403 (see FIG. 7) identifies an electrical outlet whose power consumption changes (increases) from a value less than the constant value to the constant value or greater. The electrical outlet can be identified based on the information, sent from the power source circuit 40c, on transition of power.

If an image forming apparatus 1 connected to any one of the electrical outlets receives the network print job data, then the electrical outlet thus connected is identified. When the electrical outlet can be identified, the power consumption notification processing portion 403 sends, to the switching hub 3, connection reply data 73 representing an identifier of the identified electrical outlet.

With the switching hub 3, upon receipt of the connection reply data 73, the table updating portion 303 creates deactivation method data 6, and stores the same into the power-saving mode deactivation table 301 (Step #810).

The created deactivation method data 6 has, in "MAC address", a MAC address of the image forming apparatus 1 that is the destination device of the network print job data sent the last time. The deactivation method data 6 shows, in "deactivation method", that a wake-up signal for starting supplying power to an electrical outlet corresponding to the identifier indicated in the connection reply data 73 is to be sent, over ZigBee, to an address of the transmission source device from which the connection reply data 73 was sent. In "TCP/IP port number" of the created deactivation method data 6, a port number of a port (TCP/IP port) used by the corresponding image forming apparatus 1 for network printing is shown.

When the processing of Steps #805 and #808-#810 is performed, deactivation method data 6B is stored in the switching hub 3 as deactivation method data 6 for the image forming apparatus 1B. It is desirable that the processing of Steps #805 and #808-#810 be performed under a state in which the power-saving modes of all the image forming apparatuses 1 are deactivated.

On the other hand, in Step #805, if the image forming apparatus 1 is the transmission source device of the switchable reply data 72 (No in Step #807), then the table updating portion 303 creates deactivation method data 6 for the image forming apparatus 1, and stores the same into the power-saving mode deactivation table 301 (Step #811).

The created deactivation method data 6 has, in "MAC address", a MAC address indicated in the switchable reply data 72. The deactivation method data 6 shows, in "deactivation method", that a wake-up signal is to be sent, over ZigBee, to an address of the transmission source device from which the switchable reply data 72 was sent. In "TCP/IP port number" of the created deactivation method data 6, a port number of a port (TCP/IP port) used by the corresponding image forming apparatus 1 for network printing is shown.

When the processing of Steps #805 and #811 is performed, deactivation method data 6A is stored in the switching hub 3 as deactivation method data 6 for the image forming apparatus 1A.

[Processing for Deactivation of Power-Saving Mode, Etc.]

Referring back to FIG. 4, when the switching hub 3 receives packets 76 for network print job from the terminal 2, the communication circuit 30c stores the packets 76 into the buffer 30d as per the conventional art, and determines, based on the address management table 30e, a connection port to which an image forming apparatus 1 that is the destination device of the packets 76 and a MAC address of the image forming apparatus 1. Then, the switching hub 3 sends out the packets 76 to the connection port so that the packets 76 are delivered to the MAC address. When the switching hub 3 confirms that the packets 76 were delivered to the image forming apparatus 1, for example, when the switching hub 3 receives an ACK signal therefrom, the packets 76 are deleted from the buffer 30d.

However, the packets 76 are not delivered to the image forming apparatus 1 in some cases. The reason for this is probably that the power mode of the image forming apparatus 1 is a power-saving mode, or, alternatively, that the image forming apparatus 1 is turned OFF.

With this being the situation, the communication circuit 30c and the deactivation necessity determining portion 304 through the power ON signal transmission control portion 307 shown in FIG. 4 perform the processing as described below so that the power-saving mode of the image forming apparatus 1 is deactivated, or, alternatively, that the image forming apparatus 1 is turned ON.

If no ACK signal is received in the switching hub 3 after a preset time period has elapsed since the switching hub 3 sent the packets 76, then the communication circuit 30c conveys the packets 76 to the controller 30a.

The deactivation necessity determining portion 304 searches, in the power-saving mode deactivation table 301 (see FIG. 9), for deactivation method data 6 containing the MAC address and the port number of the destination device indicated in the packets 76 conveyed from the communication circuit 30c. If such deactivation method data 6 is found out by the search, then the deactivation necessity determining portion 304 determines that it is necessary to deactivate the power-saving mode of the destination device, or, alternatively, to turn ON the destination device.

When the deactivation necessity determining portion 304 determines that it is necessary to deactivate the power-saving mode of the destination device, or, alternatively, to turn ON the destination device, the power-saving mode deactivation method determining portion 305 determines that a deactivation method indicated in the deactivation method data 6 found out by the search is used for the deactivation.

The magic packet transmission control portion 306 and the power ON signal transmission control portion 307 perform the following processing depending on the method determined by the power-saving mode deactivation method determining portion 305.

In the case of a method in which magic packets are sent over the LAN, the magic packet transmission control portion 306 sends the magic packets through the communication circuit 30c to the MAC address indicated in the deactivation method data 6.

In this method for example, when the magic packets are sent to the image forming apparatus 1C, the image forming apparatus 1C deactivates the power-saving mode thereof. Then, after a preset time period has elapsed since the magic packets were sent, the communication circuit 30c sends the packets 76 stored in the buffer 30d again to the image forming apparatus 1C. Note that the preset time period is a time period required for the power-saving mode to be completely deactivated. It is desirable that the preset time period be preset for each of the deactivation methods by making measurements, for example.

If the method determined by the power-saving mode deactivation method determining portion 305 is a method in which an electrical outlet is selected and a wake-up signal is sent over ZigBee, then the power ON signal transmission control portion 307 generates a wake-up signal 51 indicating an identifier of the electrical outlet based on the deactivation method data 6, and sends the generated wake-up signal 51 through the short-range wireless device 30f to another short-range wireless device.

For example, when the wake-up signal 51 is generated based on the deactivation method data 6B, the power ON signal transmission control portion 307 generates the wake-up signal 51 indicating "01" as the identifier of the electrical outlet, and sends the generated wake-up signal 51 through the short-range wireless device 30f to the address "00EEFF". When the wake-up signal 51 indicates an identifier of an electrical outlet, the transmission destination of the wake-up signal 51 is any one of the intelligent power strips 4.

With the intelligent power strip 4, when the short-range wireless device 40d receives the wake-up signal 51, the power source circuit 40c starts supplying power to an electrical outlet corresponding to the identifier indicated in the wake-up signal 51. This turns ON an image forming apparatus 1 connected to the electrical outlet, e.g., the image forming apparatus 1B.

With the switching hub 3, after the wake-up signal 51 is sent, the communication circuit 30c sends the packets 76 stored in the buffer 30d again to the image forming apparatus 1. Note that the preset time period is a time period required for the image forming apparatus 1 to start up completely.

If the method determined by the power-saving mode deactivation method determining portion 305 is a method in which a wake-up signal is sent over ZigBee without selecting an electrical outlet, then the power ON signal transmission control portion 307 generates a wake-up signal 51, and sends, based on the deactivation method data 6, the generated wake-up signal 51 through the short-range wireless device 30f to another short-range wireless device. In the case where no electric outlet is selected, the destination device of the wake-up signal 51 is any one of the image forming apparatuses 1. With the image forming apparatus 1, e.g., the image forming apparatus 1A, upon the receipt of the wake-up signal 51, the short-range wireless device 10k requests the power controller 10j to deactivate the power-saving mode. In response to the request, the power controller 10j deactivates the power-saving mode.

With the switching hub 3, after a preset time period has elapsed since the wake-up signal 51 was sent, the communication circuit 30c sends the packets 76 stored in the buffer 30d again to the image forming apparatus 1, which is similar to the case of transmission of magic packets described above.

The terminal 2 is desirably so set that the length of a timeout for specific job packets is longer than that in usual cases.

FIG. 11 is a flowchart depicting an example of the flow of the entire processing performed by the switching hub 3.

Descriptions are provided below, with reference to the flowchart of FIG. 11, of the flow of the entire processing for relaying a certain packet.

Before the printing system 100 goes into service, the switching hub 3 performs processing for generating deactivation method data 6 for each of the image forming apparatuses 1 and storing the deactivation method data 6 thus generated into the power-saving mode deactivation table 301 (Step #11). The steps of the processing are the same as those described earlier with reference to FIG. 10.

When receiving the packets 76 from the terminal 2 (Step #12), the switching hub 3 stores the packets 76 temporarily into the buffer 30d (Step #13). Then, when the turn of the packets 76 comes, the switching hub 3 transfers the packets 76 through the communication circuit 30c to the image forming apparatus 1 corresponding to the destination (determined based on the IP address and MAC address indicated in the packets 76) (Step #14).

When an ACK signal of the packets 76 is sent from the image forming apparatus 1 (Yes in Step #15), then the switching hub 3 deletes the packets 76 from the buffer 30d or makes the packets 76 invalid (Step #16).

On the other hand, if no ACK signal is sent from the image forming apparatus 1 after a preset time period has elapsed since the packets 76 were transferred (No in Step #15), the switching hub 3 determines that the destination image forming apparatus 1 is placed in a power-saving mode. Further, if the packets 76 are ones for a specific job, i.e., are ones for network printing (Yes in Step #17), then the switching hub 3 searches for deactivation method data 6 for the destination image forming apparatus 1 (Step #18). The switching hub 3, then, performs processing for deactivating the power-saving mode of the destination image forming apparatus 1 based on the deactivation method data 6 found out by the search (Step #19). After the elapse of the preset time period, the switching hub 3 attempts to transfer the packets 76 again to the destination image forming apparatus 1 (Step #20).

If the packets 76 are not ones for a specific job (No in Step #17), then the switching hub 3 may give an error message to the terminal 2 as per the conventional art without the processing for deactivating the power-saving mode. If failing to attempt the transfer in Step #20, then the switching hub 3 may abandon the deactivation of the power-saving mode and give an error message to the terminal 2.

It is desirable to perform the processing of Step #11, specifically, the processing shown in FIG. 10, appropriately even after the printing system 100 goes into service, and to update the power-saving mode deactivation table 301.

According to this embodiment, even in a network including different types of image forming apparatuses 1, power-saving modes of the image forming apparatuses 1 can be deactivated more reliably than with the conventional methods.

In addition, the switching hub 3 checks the specifications of the individual image forming apparatuses 1 and so on to create deactivation method data 6 for each of the image forming apparatuses 1. Thus, settings for deactivation of the power-saving modes can be made without bothering a user.

In this embodiment, the switching hub 3 obtains management data 71, namely, MIB data, and determines whether or not the image forming apparatus 1 is compatible with the WOL based thereon. However, another determination method is possible. For example, when the image forming apparatus 1 operates, the switching hub 3 sends magic packets through the communication circuit 30*c* to the image forming apparatus 1. After that, the switching hub 3 also sends a signal such as a PING to the image forming apparatus 1 and waits for a reply therefrom. If receiving a reply, then the switching hub 3 determines that the image forming apparatus 1 is not compatible with the WOL. Otherwise, the switching hub 3 determines that the image forming apparatus 1 is compatible with the WOL. It is also possible to send magic packets once again to the image forming apparatus 1 and to confirm whether or not the image forming apparatus 1 returns to a normal mode by sending the PING. This increases the accuracy of determination as to whether or not the image forming apparatus 1 is compatible with the WOL.

Likewise, the switching hub 3 may determine whether or not the image forming apparatus 1 is provided with the short-range wireless device 10*k* having the foregoing specifications in the following manner. To be specific, the switching hub 3 sends, in a normal power mode, a signal corresponding to magic packets through the short-range wireless device 30*f* to the image forming apparatus 1. The switching hub 3, then, sends a signal such as PING through the communication circuit 30*c* to the image forming apparatus 1, and waits for a reply therefrom. If receiving a reply, then the switching hub 3 determines that the image forming apparatus 1 is not provided with the short-range wireless device 10*k*. Otherwise, the switching hub 3 determines that the image forming apparatus 1 is provided with the short-range wireless device 10*k*. It is also possible to send a signal corresponding to magic packets once again to the image forming apparatus 1 and to confirm whether or not the image forming apparatus 1 returns to a normal mode by sending the PING. This increases the accuracy of determination as to whether or not the image forming apparatus 1 is provided with the short-range wireless device 10*k*.

In this embodiment, deactivation of the power-saving mode is described above by taking an example in which packets of network print job data are not delivered to the destination image forming apparatus 1. Instead of this, however, the present invention is also applicable to the case where packets of other types of job data are not delivered to the destination device. For example, the present invention is applicable to the case where packets of data for an image transmission job by facsimile, a so-called FAX transmission job, are not delivered to the destination device. Further, the present invention is also applicable to the case where packets of data for a job of saving a file to a box, or, alternatively, packets of data for a job of reading out a file from a box are not delivered to the destination device. The kind of a job can be determined based on a TCP/IP port number of packets.

Another arrangement is also possible regardless of the kind of a job, etc. To be specific, processing for deactivating the power-saving mode may be executed if unicast packets are not delivered, and the processing may not be executed if broadcast packets or multicast packets are not delivered.

If the power-saving mode has a plurality of levels, return levels may be changed depending on the kind of a job corresponding to packets. For example, in the case of packets for a job involving printing, the destination apparatus may be restored to a normal mode. In contrast, in the case of packets for a job not involving printing, the destination apparatus may be restored to a level at which the NIC 10*g* is operated but the printer unit 10*f* is not operated.

The embodiment takes an example in which the power-saving mode of the image forming apparatus 1 is deactivated. Other than this, the present invention is applicable to the case where a power-saving mode of a device that is not of a multi-functional type is deactivated. For example, among various functions such as copying, faxing, scanning, network printing, and box (document server) function, the present invention is also applicable to the case where a power-saving mode of a facsimile terminal having only a facsimile function is deactivated. Alternatively, the present invention is applicable to the case where a power-saving mode of a Network Attached Storage (NAS) having only a document server function is deactivated. In essence, according to the present invention, in a network including different types of image forming apparatuses 1, power-saving modes of the image forming apparatuses 1 can be deactivated more reliably than with the conventional methods.

In this embodiment, management data 71 is obtained from the image forming apparatus 1 in accordance with the SNMP and a method for deactivating a power-saving mode is determined. Instead of this, however, another configuration is possible in which an application for informing a deactivation method of a power-saving mode is installed onto the image forming apparatus 1, and the deactivation method is determined by causing the image forming apparatus 1 to execute the application.

If a period of day during which users can use the image forming apparatus 1 is limited, it is possible to limit processing for deactivating the power-saving mode thereof.

Assume that, for example, using the image forming apparatus 1 at nighttime is prohibited. In such a case, when packets for a specific job are delivered to the image forming apparatus 1, if it is at nighttime, processing for deactivating the power-saving mode of the image forming apparatus 1 is not performed. A user can set optionally a period of day during which deactivation processing is performed.

It is to be understood that the configurations of the printing system 100, the image forming apparatus 1, and the switching hub 3, the constituent elements thereof, the content and order of the processing, the configuration of data, and the like can be appropriately modified without departing from the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An apparatus for deactivating a power-saving mode of a plurality of specific processing apparatuses through communication via a communication network, the plurality of specific processing apparatuses configured to perform particular processing, the apparatus for deactivating a power-saving mode comprising a hardware processor configured to:
    send particular processing data for the particular processing to a destination specific processing apparatus which is one of the plurality of specific processing apparatus before a deactivation processing;
    deactivate a power-saving mode of the destination specific processing apparatus based on a deactivation method for the destination specific processing apparatus among a plurality of deactivation methods for the plurality of specific processing apparatuses when it is detected that the particular processing data is not delivered to the destination specific processing apparatus; and
    send again the particular processing data to the destination specific processing apparatus after the deactivation processing.

2. The apparatus according to claim 1, wherein the hardware processor is configured to, when it is detected that the particular processing data is not delivered to the destination specific processing apparatus, send again the particular processing data to the destination specific processing apparatus after a preset time period has elapsed after the deactivation processing.

3. The apparatus according to claim 1, wherein deactivating the power-saving mode makes it possible for the plurality of specific processing apparatuses to receive the particular processing data and to perform the particular processing.

4. The apparatus according to claim 3, wherein
    the particular processing performed by the plurality of specific processing apparatuses is print processing to form an image on a sheet of paper by a printer unit including a fuser for fusing a toner image on the sheet of paper, and
    deactivating the power-saving mode makes it possible for the plurality of specific processing apparatuses to receive, as the particular processing data, data for the print processing and to perform the print processing.

5. The apparatus according to claim 1, wherein the hardware processor detects that the particular processing data is not delivered to the destination specific processing apparatus when the hardware processor does not receive a reply for the particular processing data from the destination specific processing apparatus.

6. The apparatus according to claim 1, wherein the plurality of deactivation methods for the plurality of specific processing apparatuses is stored in a memory in the apparatus.

7. A relay device for relaying, to a destination specific processing apparatus of a plurality of specific processing apparatuses configured to perform particular processing, particular processing data for the particular processing, the relay device comprising a hardware processor configured to:
    send particular processing data for the particular processing to the destination specific processing apparatus which is one of the plurality of specific processing apparatus before a deactivation processing;
    deactivate a power-saving mode of the destination specific processing apparatus based on a deactivation method, for the destination specific processing apparatus among a plurality of deactivation methods for the plurality of specific processing apparatuses when it is detected that the particular processing data is not delivered to the destination specific processing apparatus; and
    send again the particular processing data to the destination specific processing apparatus after the deactivation processing.

8. The relay device according to claim 7, wherein the hardware processor is further configured to:
    obtain characteristic data indicating a characteristic of each of the plurality of specific processing apparatuses, and
    determine the deactivation method for said each of the plurality of specific processing apparatuses based on the characteristic data.

9. The relay device according to claim 7, wherein deactivating the power-saving mode makes it possible for the plurality of specific processing apparatuses to receive the particular processing data and to perform the particular processing.

10. The relay device according to claim 9, wherein
    the particular processing performed by the plurality of specific processing apparatuses is print processing to form an image on a sheet of paper by a printer unit including a fuser for fusing a toner image on the sheet of paper, and
    deactivating the power-saving mode makes it possible for the plurality of specific processing apparatuses to receive, as the particular processing data, data for the print processing and to perform the print processing.

11. The relay device according to claim 8, wherein, if the hardware processor obtains, as the characteristic data of one of the plurality of specific processing apparatuses, data indicating that said one of the plurality of specific processing apparatuses is compatible with a Wake On LAN (WOL), then the hardware processor determines that the deactivation method to be used for said one of the plurality of specific processing apparatuses is to send magic packets to said one of the plurality of specific processing apparatuses.

12. The relay device according to claim 8, wherein, if the hardware processor obtains, as the characteristic data of one of the plurality of specific processing apparatuses, data indicating that a short-range wireless communication portion is provided which performs short-range wireless communication via a second communication network different from a communication network used for passing the particular processing data and operates even under a power-saving mode, then the hardware processor determines that the deactivation method to be used for said one of the plurality of specific processing apparatuses is to send a signal for deactivating the power-saving mode to said one of the plurality of specific processing apparatuses via the second communication network.

13. The relay device according to claim 8, wherein, if the hardware processor obtains, as the characteristic data of one of the plurality of specific processing apparatuses, data indicating that said one of the plurality of specific processing apparatuses is supplied with power via an intelligent power strip, then the hardware processor determines that the deactivation method to be used for said one of the plurality of specific processing apparatuses is to instruct the intelligent power strip to start supplying power.

14. The relay device according to claim 7, wherein the hardware processor is configured to, when the particular processing data cannot be relayed to the destination specific processing apparatus, send again the particular processing data to the destination specific processing apparatus after a preset time period has elapsed after the deactivation processing.

15. The relay device according to claim 7, wherein the hardware processor detects that the particular processing data is not delivered to the destination specific processing apparatus when the hardware processor does not receive a reply for the particular processing data from the destination specific processing apparatus.

16. A method for deactivating a power-saving mode of each of a plurality of specific processing apparatuses configured to perform particular processing, the method comprising:
    sending particular processing data for the particular processing to a destination specific processing apparatus which is one of the plurality of specific processing apparatus before a deactivation processing;
    deactivating a power-saving mode of the destination specific processing apparatus based on a deactivation method for the destination specific processing apparatus among a plurality of deactivation methods for the plurality of specific processing apparatuses when it is detected that the particular processing data is not delivered to the destination specific processing apparatus; and
    sending again the particular processing data to the destination specific processing apparatus after the deactivation processing.

17. The method according to claim 16, wherein the hardware processor detects that the particular processing data is not delivered to the destination specific processing apparatus when the hardware processor does not receive a reply for the particular processing data from the destination specific processing apparatus.

18. A non-transitory computer-readable storage medium storing thereon a computer program used in a computer for deactivating a power-saving mode of each of a plurality of specific processing apparatuses configured to perform particular processing, the computer program causing the computer to implement processes comprising:
    sending particular processing data for the particular processing to a destination specific processing apparatus which is one of the plurality of specific processing apparatus before a deactivation processing;
    deactivating a power-saving mode of the destination specific processing apparatus based on a deactivation method for the destination specific processing apparatus among a plurality of deactivation methods for the plurality of specific processing apparatuses when it is detected that the particular processing data is not delivered to the destination specific processing apparatus; and
    sending again the particular processing data to the destination specific processing apparatus after the deactivation processing.

19. The non-transitory computer-readable storage medium according to claim 18, wherein the hardware processor detects that the particular processing data is not delivered to the destination specific processing apparatus when the hardware processor does not receive a reply for the particular processing data from the destination specific processing apparatus.

* * * * *